S. HASLAM, Jr.
MACHINE FOR PRODUCING RECIPROCATING MOTION IN KNITTING MACHINES, &c.
No. 80,283. Patented July 28, 1868.
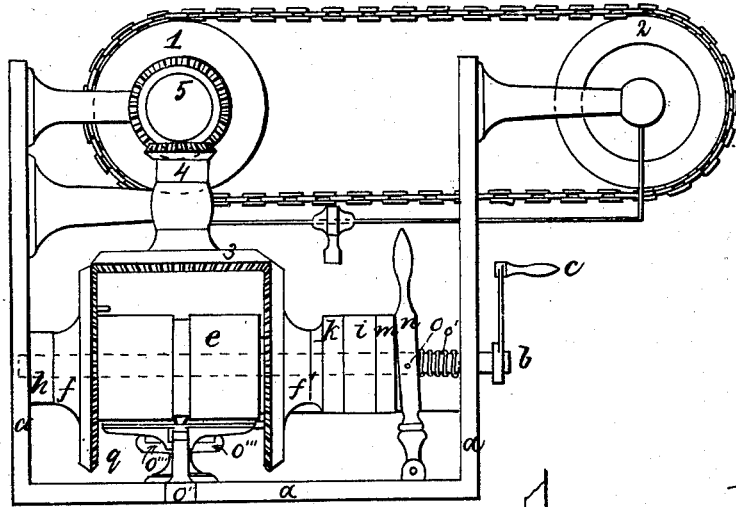
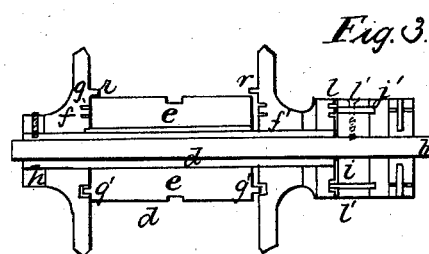
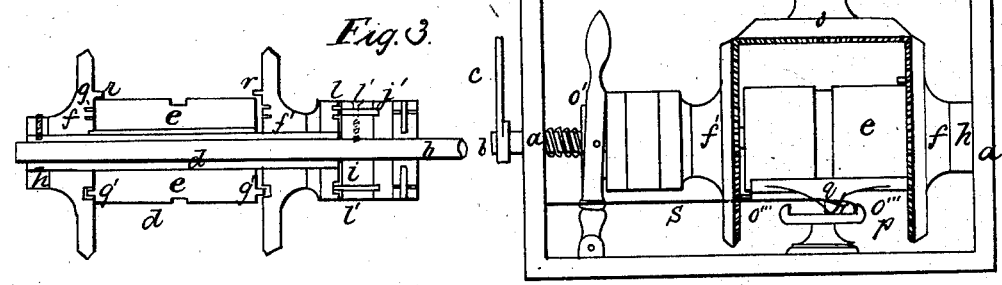
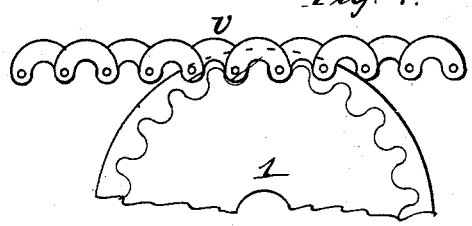
Witnesses,
N. C. Wilder
J. W. Bliss
Inventor,
Septimus Haslam Jr

United States Patent Office.

SEPTIMUS HASLAM, JR., OF NEW BRITAIN, CONNECTICUT, ASSIGNOR TO HIMSELF AND JOHN B. TALCOTT.

Letters Patent No. 80,283, dated July 28, 1868.

IMPROVEMENT IN MACHINE FOR PRODUCING A RECIPROCATING MOTION IN KNITTING-MACHINES, &c.

The Schedule referred to in these Letters Patent and making part of the same.

TO ALL WHOM IT MAY CONCERN:

Be it known that I, SEPTIMUS HASLAM, Jr., of New Britain, county of Hartford, and State of Connecticut, have invented certain new and useful Improvements in Drawing a Cross-Motion for Knitting-Machines, loom or other machines, to which it may be applicable; and to enable others skilled in the art to make and use the same, I will proceed to describe its construction and operation by referring to the drawings, in which the same letters indicate like parts in each of the figures.

The nature of this invention will be understood from the specification and drawings.

The object desired to be attained thereby is to provide a self-acting reciprocating motion, which shall be positive in its action, and not liable to get out of order, and which may be suspended at interims, when necessary.

This machine may be applied to knitting-machines now in use, known as straight-knitting machines.

It is to be understood that this device is an independent machine, and can be used with any of the straight-knitting machines as an attachment.

In the accompanying drawings—

Figure 1 is a side elevation.

Figure 2 is a view of a portion of the opposite side.

Figure 3 is a sectional view of the clutch or change-motion.

Figure 4 is a view showing the construction of the metal chain and flange-gear, by means of which I am enabled to keep the traverse-motion or slur-cock always in its proper place and position, and to secure a positive action thereof in harmony with its relative parts; and here I wish to state that for the purpose of showing the device in a compact form, I have arranged the flange-wheel 2 at the right hand, but when put in use, the wheel 2, with the slur-cock bar $x$, will be placed in a line with and upon the opposite side or direction of the wheel 1, and at the proper or desired distance therefrom, or *vice versa*, as occasion requires for a right or left-hand machine.

$a$ is the framework of this attachment.

$b$ is a driving-shaft, which takes its bearings in the framework.

$c$ is a crank or pulley, for imparting motion to said shaft.

$d$ is a sleeve, fitted closely and working freely upon the shaft $b$.

$e$ is a clutch, fitted closely and working freely in a lateral direction with and upon the sleeve $d$, and is held from revolving, except with the sleeve, by a spline, not shown.

$f f'$ are bevel-gears, fitted closely and revolving freely upon the sleeve $d$, one at each end of the clutch $e$. These gears are provided with grooves, in which are secured clutch-pins, $g$, and the clutch is provided with clutch-pins $g'$. These pins are so arranged that when the clutch moves back and forth between the gear-wheels $f f'$, the pins $g'$ will strike first one and then the other of the pins $g$, thus causing a reverse or change-motion of the flange-wheels or gears 1 and 2 through the gears 3 4 5.

$h$ is a collar, for holding the gear $f$ in its proper place relatively to the gear 3.

$i$ is a collar secured to the shaft $b$ by a pin or screw, $j$, which, with the intermediate collar $k$, holds the gear $f'$ in its relative position to the gear 3. This collar $k$ is made or secured on the end of the sleeve $d$, and in its face is formed a groove, in which are secured one or more pins, $l$.

$m$ is a collar in which are secured clutch-pins, $l'$. These pins project and play through the collar $i$, and strike the pins $l$ in the collar $k$.

This collar $m$ is also provided with a smaller side-collar, which works in and is secured to the sides of the opening of the shipper-lever $n$ by screws or pins, $o$.

$o'$ is a spring, arranged on the shaft $b$, and which takes its bearings against the framework, or its equivalent, and presses against the end of the collar $m$, to keep the pins of the collar in connection with the collar $k$, on the sleeve $d$, carrying the clutch.

If the shipper be pressed back, the motion of the device will suspend the action of the drawing-across motion during one or more revolutions of the shaft $b$, and while the narrowing operation is being performed, after which the spring $o'$ is allowed to throw said collar $m$ back into connection with the collar $k$, which imparts motion to the whole machine.

$p$ is a shipper, one end of which is secured upon a stud, $o''$, and the other end vibrates between guards, $o'''$.

$q$ is a strike-plate, secured upon the vibrating shipper-bar $p$, the ends of which extend each way nearly to the gears $f f'$, so that the pins or cams $r$, on the inner sides of the gears, will strike alternately the ends of the plate $q$, and press the shipper under the V-shaped projection formed on the spring $s$, where it will be held until again moved by the cam $r$.

$u$ is a gear, made to correspond with the half-circle link-chain gear.

$v$ is a half-circle link-chain, united by pins through the centre line of the half circle, thus forming a perfect unyielding gear.

Thus it will be seen that I produce in every part a sure, unyielding, and positive motion, and thereby secure more and better work.

In the old kind of draw-motion, whenever it fails to do its part, (and that is quite frequently,) a hole would be made in the cloth or web, or it would be pressed off the needles, and it not only would take considerable time to put it on again, but it would not be made as perfect as if the machine had continued its work unobstructed.

I believe I have thus shown the nature, construction, and advantage of this invention, so as to enable others skilled in the art to make and use the same therefrom.

What I claim, therefore, and desire to secure by Letters Patent, is—

1. The combination, with the shaft $b$, of the sleeve $d$, carrying the clutch and wheels $f f'$, and the collar $k$, and collar $i$, on the shaft, and clutch $m$, or its equivalent, substantially as described.

2. The gears $f f'$, arranged upon the sleeve $d$, in combination with the clutch $c$, plate $q$, upon the shipper $p$, and spring $s$, or their mechanical equivalents, with the gears 3 4 5 1, and chain $v$, for the purpose substantially as described.

SEPTIMUS HASLAM, Jr. [L. S.]

Witnesses:
 N. C. WILDER,
 J. W. BLISS.